US011461375B2

(12) United States Patent
Tachibana et al.

(10) Patent No.: US 11,461,375 B2
(45) **Date of Patent: *Oct. 4, 2022**

(54) USER INTERFACE FOR STREAMING SPOKEN QUERY

(71) Applicant: INTERNATIONAL BUSINESS MACHINES CORPORATION, Armonk, NY (US)

(72) Inventors: Ryuki Tachibana, Tokyo (JP); Masayuki A. Suzuki, Tokyo (JP); Issei Yoshida, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 111 days.

This patent is subject to a terminal disclaimer.

(21) Appl. No.: 16/776,596

(22) Filed: Jan. 30, 2020

(65) Prior Publication Data

US 2020/0167375 A1 May 28, 2020

Related U.S. Application Data

(63) Continuation of application No. 14/937,536, filed on Nov. 10, 2015, now Pat. No. 10,614,108.

(51) Int. Cl.

| | |
|---|---|
| ***G06F 16/33*** | (2019.01) |
| ***G06F 16/638*** | (2019.01) |
| ***G06F 16/683*** | (2019.01) |
| ***G10L 15/22*** | (2006.01) |
| ***G06F 3/16*** | (2006.01) |
| *G10L 15/18* | (2013.01) |

(52) U.S. Cl.

CPC .............. *G06F 16/334* (2019.01); *G06F 3/16* (2013.01); *G06F 16/638* (2019.01); *G06F 16/685* (2019.01); *G10L 15/22* (2013.01); *G10L 15/1815* (2013.01); *G10L 2015/221* (2013.01)

(58) Field of Classification Search

None

See application file for complete search history.

(56) References Cited

U.S. PATENT DOCUMENTS 6,260,015 B1 * 7/2001 Wang ...................... G10L 15/22 704/E15.04
7,529,665 B2 * 5/2009 Kim ....................... G10L 15/08 704/231

(Continued)

FOREIGN PATENT DOCUMENTS

JP 2010066870 3/2010

OTHER PUBLICATIONS

Akinori Ito, et al., Relevant Retrieval Using a Spoken Document, Communications and Information Technology, ISCIT 2009, 9th International Symposium, Sep. 28-30, 2009.

(Continued)

*Primary Examiner* — Kim T Nguyen

(74) *Attorney, Agent, or Firm* — Tutunjian & Bitetto, P.C.; Randall Bluestone

(57) ABSTRACT

Methods and systems for information retrieval include analyzing audio data to produce word hypotheses. Displaying the word hypotheses in motion at different respective speeds at once across a graphical display. Information is retrieved in accordance with one or more selected terms from the displayed word hypotheses.

15 Claims, 2 Drawing Sheets

Capture streaming speech data 102

Recognize speech to produce best *n* results with respective confidence scores 104

Assign importance score to each result 106

Remove results having an importance score below a threshold 108

Display results with font size according to their respective importance score 110

Move displayed results with speeds according to their respective confidence score 112

Search for information responsive to a user's selection of a result 114

(56) References Cited

U.S. PATENT DOCUMENTS 8,131,735 B2 3/2012 Rose et al.
8,554,558 B2 10/2013 McCarley et al.
8,909,538 B2 12/2014 Kondziela
9,224,391 B2 * 12/2015 Colibro ................... G10L 15/19
9,514,749 B2 * 12/2016 Lee ......................... G06F 3/167
9,733,489 B2 * 8/2017 Paille ..................... A61B 3/028
10,614,108 B2 * 4/2020 Tachibana ............. G06F 16/334
2002/0019731 A1 * 2/2002 Masui ................... G06F 40/274 704/7
2004/0152054 A1 * 8/2004 Gleissner ............... G09B 19/06 434/156
2005/0010952 A1 * 1/2005 Gleissner ............... G09B 17/00 725/135
2007/0028184 A1 * 2/2007 Jang .................... G06F 3/04842 715/769
2007/0168413 A1 * 7/2007 Barletta .............. G06F 16/9577 707/E17.121
2007/0249406 A1 10/2007 Andreasson
2008/0291206 A1 * 11/2008 Uchimura .............. H04N 5/765 386/E5.064
2010/0241507 A1 * 9/2010 Quinn ................ G06Q 30/0256 705/14.42
2010/0306249 A1 * 12/2010 Hill ..................... G06F 16/9535 707/769
2011/0224982 A1 9/2011 Acero et al.
2012/0296911 A1 11/2012 Omura et al.
2013/0311186 A1 * 11/2013 Lee ......................... G06F 16/60 704/260
2013/0323692 A1 * 12/2013 Freimuth ................. G09B 5/00 434/169
2014/0128146 A1 * 5/2014 Story, Jr. ............... A63F 13/217 463/36
2014/0268246 A1 * 9/2014 Ohguro .............. H04N 1/00331 358/403
2014/0337892 A1 * 11/2014 Phang .............. H04N 21/47217 725/52
2014/0362718 A1 * 12/2014 Nagamine ........... H04L 43/0894 370/252
2015/0033151 A1 * 1/2015 Lim .................... H04M 1/7243 715/753
2017/0256101 A1 * 9/2017 Emoto .................... G06T 19/20
2018/0005503 A1 * 1/2018 Kaindl ..................... G08B 6/00

OTHER PUBLICATIONS

Hara Kensuke, et al., Confidence Estimation and Keyword Extraction From Speech Recognition Result Based on Web Information, Signal and Information Processing Association Annual Summit and Conference (APSIPA), Oct. 29-Nov. 1, 2013.
A. Moreno-Daniel, et al., Spoken Query Processing for Information Retrieval, Acoustics, Speech and Signal Processing, 2007, ICASP 2007, IEEE International Conference on (vol. 4), Apr. 15-20, 2007.
Atsushi Fujii, et al., Speech-Driven Text Retrieval: Using Target IR Collections for Statistical Language Model Adaptation in Speech Recognition, Information Retrieval Techniques for Speech Applications Lecture Notes in Computer Science vol. 2273, pp. 94-104, Jan. 22, 2002.
List of IBM Patents or Patent Applications Treated as Related dated Jan. 30, 2020, 2 pages.

* cited by examiner

USER INTERFACE FOR STREAMING SPOKEN QUERY

BACKGROUND

Technical Field

The present invention relates to user interfaces for information retrieval and, more particularly, to information retrieval based on automated speech recognition and user guidance.

Description of the Related Art

As users conduct conversations, for example over the phone or with voice or video chat software, the need will often arise to access a document that is pertinent to the discussion. Users may have difficulty finding such documents while simultaneously conducting their conversation, particularly if it necessitates switching to a different window or system and covering the video component of a video chat.

In addition, automating the retrieval of information based on a conversation is difficult. For example, automated speech recognition has difficulty determining correct search terms from human speech, which may result in the correct information being overlooked. As such, there are no adequate solutions for automated information retrieval responsive to a real-time conversation.

SUMMARY

A method for information retrieval includes analyzing audio data to produce word hypotheses. Displaying the word hypotheses in motion at different respective speeds at once across a graphical display. Information is retrieved in accordance with one or more selected terms from the displayed word hypotheses.

A system for information retrieval includes a speech recognition module that includes a processor configured to analyze audio data to produce a plurality of word hypotheses. A graphical user interface is configured to display the plurality of word hypotheses in motion at different respective speeds at once across a graphical display. An information retrieval module is configured to retrieve information in accordance with one or more selected terms from the displayed word hypotheses.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention use automated speech recognition (ASR) to generate a list of the n best matches in a real-time conversation to use as keywords. A user interface then provides a visual scrolling interface of all of the keywords, allowing a user to select one or more of the keywords to use for information retrieval.

Using real-time ASR, the results of conversations can be used as input for information retrieval queries to retrieve documents relative to the conversation. For example, automatic retrieval of a particular manual or frequently asked questions would be particularly useful for a tech support call center agent, who would then not need to manually call up the information.

ASR generally operates by producing a list of possible transcriptions for a given word and finding the most probable match. One challenge in using the most likely match, however, is that recognition errors nevertheless frequently occur. An information retrieval query that is based solely on the most likely match is likely to have an unacceptably high rate of failure, as the system would frequently fail to find a match or would return erroneous results.

To address this problem, the present embodiments provide all of the top n results of ASR to the user. Using all of the results to perform information retrieval increases the likelihood of finding the correct document(s), but does so at the expense of also producing a large number of irrelevant documents due to the greater number of recognition errors present in these results.

One possible solution to this problem is to present all of the recognized keywords on the screen at once and allow the user to select which options they may find most appropriate. However, showing all of the keywords in the n best results will quickly fill the screen with keywords, making it difficult to find the correct keywords to select to reach a particular kind of data.

In one particular embodiment, these possible matches are provided as a scrolling interface, where keywords move across the screen as the conversation goes on, giving the user the opportunity to select one or more of the keywords for information retrieval. The present embodiments thereby combine automatic and manual elements, allowing the user to guide the automatic speech recognition and information lookup by selecting specific options out of the automatically generated set.

Figure 1:
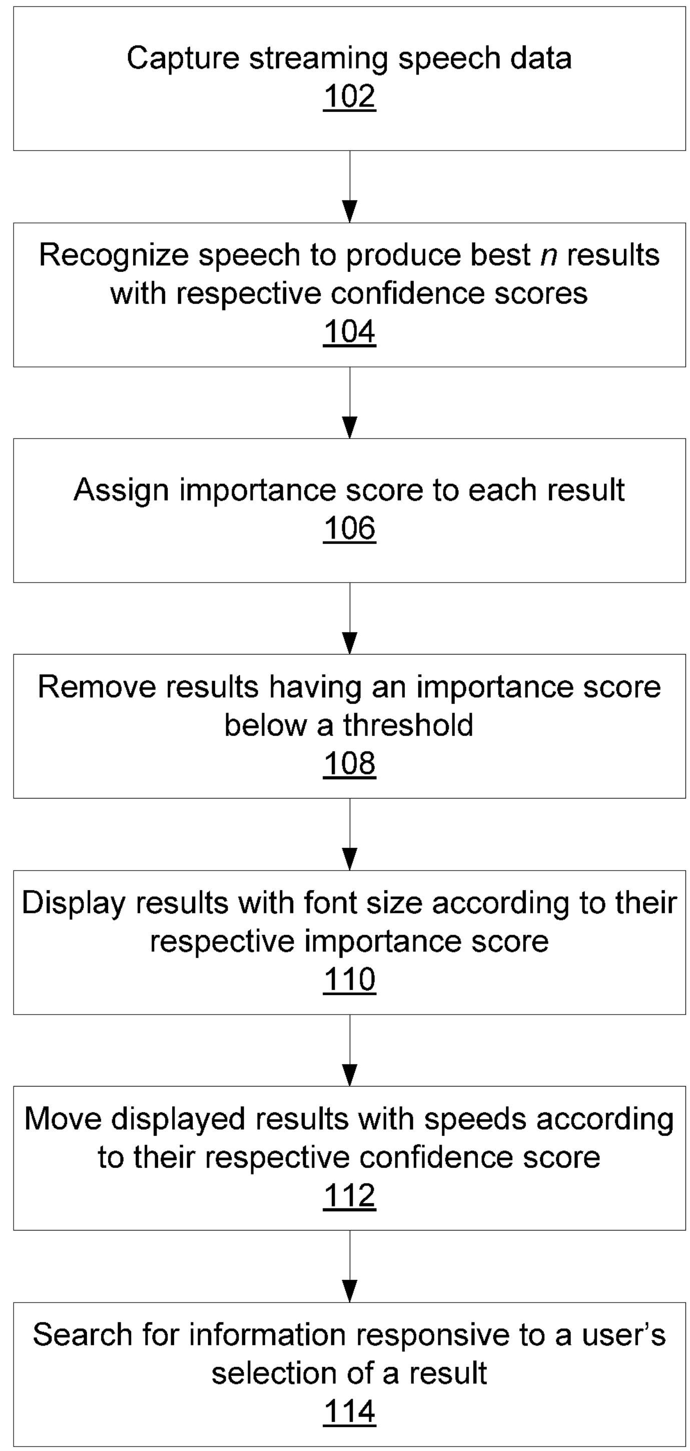
FIG. 1 is a block/flow diagram of an information retrieval method in accordance with the present principles.

Referring now to the drawings in which like numerals represent the same or similar elements and initially to FIG. 1, an information retrieval method is shown. Block 102 captures streaming speech data from one or more sensors. It is specifically contemplated that the information may be collected from a microphone at the user's position, from a microphone at the position of the person the user is talking to, from information transmitted between the users, or some combination of the above. It is particularly contemplated that speech data may be captured directly from a computer microphone and combined with speech data received from a streaming speech service or directly from another user.

Block 104 performs ASR to process the speech data and to produce, for each spoken word, the best n ASR results, representing different possible interpretations of the word. Each result is assigned a respective confidence score that reflects the ASR process's confidence that the result in question is the correct interpretation of the speech data. In one exemplary embodiment, each result may be assigned a percentage score that represents the confidence in the result relative to the other results.

Block 106 assigns an importance score to each of the results. This importance score is distinct from the confidence score and represents a likelihood that the result in question is relevant to information that the user may want to retrieve.

To use a trivial example, if the user speaks the word, "the," this word is unlikely to produce useful information retrieval results and would thus have a low importance score. On the other hand, if the user speaks a specific product name, brand name, or other identifying information, this is quite likely to be relevant to the discussion and will have a high importance score. Block 108 then removes any results having an importance score that is lower than an importance threshold. This reduces the number of results to keep the user's interface from becoming too cluttered.

Block 110 displays the remaining results on a graphical user interface. The size of the displayed results corresponds to the importance score of each respective result. In this way, terms that are more likely to be relevant are emphasized, both in the user's attention and in the user's ability to easily interact with them. Block 112 moves the displayed results across a screen area with a speed that has an inverse relationship to each result's confidence score. In other words, as the confidence score increases, results are scrolled across the screen at a slower speed, giving the user more time to interact with them before they disappear. Block 112 also handles the removal of results from the screen when they reach a far edge of the screen area.

After a user selects one or more of the results from the screen, whether by clicking using a pointer, through a key combination, or some other form of human-computer interaction, block 114 performs a search for information that relates to the user's selection. This search may be, for example, a search on a search engine, a search through a private or public archive, a database query, or some other structured or unstructured information retrieval operation. The information retrieved by block 114 may be presented to the user via, e.g., a graphical user interface, by saving the information locally, by printing a document to hardcopy form, etc.

The present embodiments solve the problem of tokenization boundary mismatch between ASR and information retrieval systems. Tokenization boundary mismatch arises when the ASR process divides terms into chunks in a way that does correspond well to the way those terms are written, such that an information retrieval search based solely on the ASR results will not find the correct information. In one example, if a user speaks the term, "HTML5," the ASR process may mistakenly transcribe this as two separate terms, "HTML," and the word, "five." Performing a search based on these terms separately, or even using both terms but with the numeral spelled out, will produce inaccurate results. For results which have multiple different tokenizations, those different options should be displayed on the user interface to allow the user to select the most appropriate term.

Figure 2:
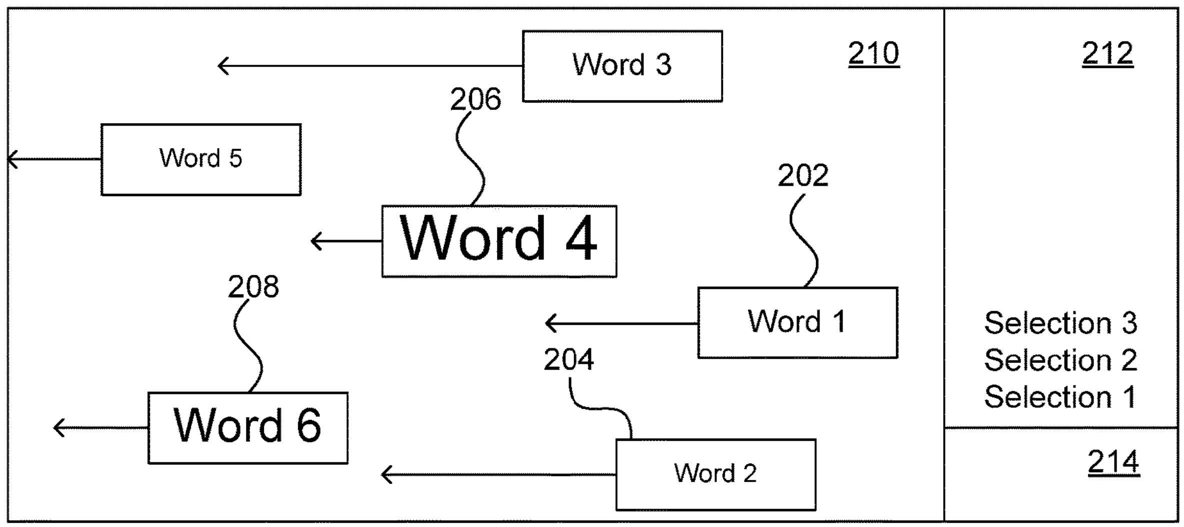
FIG. 2 is a diagram of a graphical user interface in accordance with the present principles.

Referring now to FIG. 2, a diagram of an exemplary user interface is shown. The user interface includes three main regions: a scroll area 210, a selection stack 212, and a search button 214. The scroll area 210 displays a set of results, each of which has a font size and a scroll speed set in accordance with its importance and confidence scores. In this diagram, the lengths of the arrows indicate a speed and are not intended to represent visual design elements. A first result 202 shows a result having an average importance and confidence. A second result 204 has a lower importance and confidence—thus its font size is smaller and the arrow representing its speed is longer. A third result 206 has very high importance and confidence—thus its font size is large and its speed is lower. Although the embodiment shown has only horizontal motion from right to left, it is contemplated that any combination of orientation and direction may be employed. It is also contemplated that non-linear paths may be used if appropriate. In addition, other visual identifiers, such as color, may be used to group and emphasize different results, with high-contrast colors being used to emphasize particularly useful results.

Generally the interface will attempt to put results onto different horizontal paths, to minimize interference between different results. However, in a situation where many results are available at once (for example, in a rapid conversation that has a high number of keywords), the scroll area 210 may include multiple results on a same horizontal path. In one example, the second result 204 and a fourth result 208 are on overlapping horizontal paths. In this case, the interface determines that the fourth result 208 will finish its trip across the scroll area 210 before the second result 204 reaches its position, thereby ensuring that there will be no collision. In addition, new, slow-moving result can always be placed on a same horizontal path as an existing, faster-moving result without a risk of collision. By increasing the size and decreasing the speed of keywords with high importance and high confidence, the interface makes it easier for the user to click those keywords. Meanwhile, the other keywords are still shown, allowing the user to still select them if the ASR process was incorrect in its estimates.

In one particular embodiment, results that come from the same portion of a conversation are associated with one another and may be spatially grouped together. In this embodiment, when the user selects one result from a set of mutually associated results, the speed and size of the other associated results may also be adjusted, making it easier to select those associated words. Words may be associated with one another if they are spoken closely together in time or if there is some semantic or ontological relationship between them. For example, if a user describes a product, the product name, the brand name, and any descriptive identifiers may be taken together as associated results, allowing the user to easily build a query based on the full phrase. Color may also be used to help emphasize this grouping, with multiple results that are within the same associated set sharing a color.

In contrast, a result may be a member of a set of competing hypotheses. If, for example, multiple different tokenizations are possible for a given result and the user selects one of them, the other hypotheses may be de-emphasized and made to disappear faster. In one case, the competing hypotheses may be removed immediately. In another case, the competing hypotheses may be graphically de-emphasized by reducing their size or changing their color to be lower contrast or grayed-out.

The selection stack 212 includes a list of results that have been selected by the user. As the results move by in the scroll area 210, the user can interact with one or more of them by, e.g., clicking on them with an interface device or by using a keyboard shortcut. In the case of a keyboard shortcut, the results may be numbered, allowing the user to select results by pressing a corresponding number key. After a result has been selected, it is listed in the selection stack 212. Any number of results may be so selected to be combined into a single information retrieval query. By selecting the search button 214 the user triggers the query based on the results in the selection stack 212.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
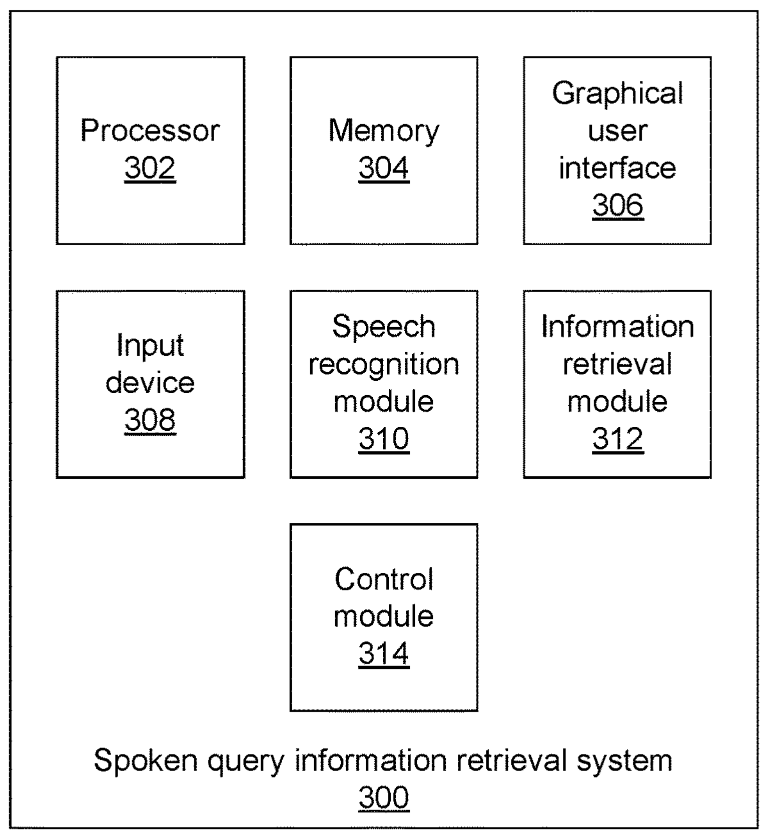
FIG. 3 is a block diagram of a spoken query information retrieval system in accordance with the present principles.

Referring now to FIG. 3, a spoken query information retrieval system 300 is shown. The system 300 includes a hardware processor 302 and a memory 304. In addition, the system 300 includes a graphical user interface 306 and an input device 308. The graphical user interface 306 may include one or more displays to present visual information to the user. The input device may include one or more of a pointer device, a keyboard, a microphone, and any other type of input mechanism.

The system 300 includes a set of functional modules. These modules may be implemented as software that is executed on the hardware processor 302 or may, alternatively, be implemented individually or together as discrete hardware components in the form of, e.g., application specific integrated chips or field programmable gate arrays.

In particular, the system includes a speech recognition module 310 that processes audio speech data and creates a set of hypotheses as to what words the speech data represents. The audio speech data may be accessed from memory 304 or may, alternatively, by streamed directly to the speech recognition module 310 from the input device 308. A control module 314 selects a set of the n best hypotheses, judged by an associated confidence score, and displays them on the graphical user interface 306 as described above.

The user selects one or more of the results using the input device 308. The control module 314 may trigger further refinements of the displayed results in the graphical user interface 306 based on user selections to make it easier for the user to select the desired results. After having selected all of the results the user desires, the user initiates an information retrieval query using the input device 308. The control module 314 passes this query to information retrieval module 312. The information retrieval module 312 in turn executes the query, either by searching for matching documents stored in local memory 304 or by accessing one or more external data stores, such as search engines, to find pertinent information. The control module 314 then provides the retrieved information to the graphical user interface 306 for display to the user.

It should be recognized that, by providing information by the information retrieval query, the present embodiments materially affect the lives of users by speeding the process of accessing that information. For example, locating such information manually may be very time consuming and distracting, detracting from the user's conversation. The above embodiments provide distinct advances in data management, query handling, and searching. In addition, data retrieval is a basic function of a computer, and so an improvement in query handling for data retrieval represents an improvement in the functioning of the computer itself.

Having described preferred embodiments of a user interface for streaming spoken query (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for information retrieval, comprising:

analyzing audio data using a processor to produce a plurality of word hypotheses;

displaying the plurality of word hypotheses in motion at different respective speeds at once across a graphical display, the speeds being based on a confidence value associated with each respective word hypothesis; and retrieving in accordance with one or more selected terms from the displayed word hypotheses.

2. The method of claim 1, wherein each of the plurality of word hypotheses has an associated importance value.

3. The method of claim 2, wherein only word hypotheses having an importance above an importance threshold are displayed.

4. The method of claim 2, wherein displaying the plurality of word hypotheses comprises displaying each word hypothesis at a larger size for larger importance values.

5. The method of claim 1, wherein analyzing audio data comprises associating sets of related and competing hypotheses.

6. The method of claim 5, wherein displaying the plurality of word hypotheses comprises visually emphasizing other hypotheses in a set of related hypotheses after a user selects a first hypothesis from the set of related hypotheses.

7. The method of claim 5, wherein displaying the plurality of word hypotheses comprises visually deemphasizing other hypotheses in a set of competing hypotheses after a user selects a first hypothesis from the set of competing hypotheses.

8. A non-transitory computer readable storage medium comprising a computer readable program for information retrieval, wherein the computer readable program when executed on a computer causes the computer to perform the steps of:

analyzing audio data using a processor to produce a plurality of word hypotheses;

displaying the plurality of word hypotheses in motion at different respective speeds at once across a graphical display, the speeds being based on a confidence value associated with each respective word hypothesis; and retrieve in accordance with one or more selected terms from the displayed word hypotheses.

9. A system for information retrieval, comprising:

a speech recognition module comprising a processor configured to analyze audio data to produce a plurality of word hypotheses;

a graphical user interface configured to display the plurality of word hypotheses in motion at different respective speeds at once across a graphical display, the speeds being based on a confidence value associated with each respective word hypothesis; and an information retrieval module configured to retrieve information in accordance with one or more selected terms from the displayed word hypotheses.

10. The system of claim 9, wherein each of the plurality of word hypotheses has an associated importance value.

11. The system of claim 10, wherein only word hypotheses having an importance above an importance threshold are displayed.

12. The system of claim 10, wherein the graphical user interface is further configured to display each word hypothesis at a larger size for larger importance values.

13. The system of claim 9, wherein the speech recognition module is further configured to associate sets of related and competing hypotheses.

14. The system of claim 13, wherein the graphical user interface is further configured to visually emphasize other hypotheses in a set of related hypotheses after a user selects a first hypothesis from the set of related hypotheses.

15. The system of claim 13, wherein the graphical user interface is further configured to visually deemphasize other hypotheses in a set of competing hypotheses after a user selects a first hypothesis from the set of competing hypotheses.

* * * * *